US009248375B2

(12) United States Patent
Bronstein Bendayan et al.

(10) Patent No.: US 9,248,375 B2
(45) Date of Patent: Feb. 2, 2016

(54) SYSTEM AND METHOD TO REPRESENT A RESOURCE OBJECT IN A VIRTUAL ENVIRONMENT

(71) Applicant: Zynga Inc., San Francisco, CA (US)

(72) Inventors: Manuel Uris Bronstein Bendayan, Palo Alto, CA (US); Werner Wright Bagwell, San Francisco, CA (US); Michael McCarthy, Oakland, CA (US)

(73) Assignee: Zynga Inc., San Francisco, CA (US)

( * ) Notice: Subject to any disclaimer, the term of this patent is extended or adjusted under 35 U.S.C. 154(b) by 149 days.

(21) Appl. No.: 13/774,760

(22) Filed: Feb. 22, 2013

(65) Prior Publication Data

US 2013/0217489 A1    Aug. 22, 2013

Related U.S. Application Data

(60) Provisional application No. 61/601,993, filed on Feb. 22, 2012.

(51) Int. Cl.
*A63F 13/00* (2014.01)
*A63F 13/30* (2014.01)

(52) U.S. Cl.
CPC ........... *A63F 13/12* (2013.01); *A63F 2300/556* (2013.01); *A63F 2300/807* (2013.01)

(58) Field of Classification Search
USPC ..................................................... 463/16–42
See application file for complete search history.

(56) References Cited

U.S. PATENT DOCUMENTS

| 2007/0067138 | A1* | 3/2007 | Rabin et al. | 702/150 |
| 2007/0238079 | A1* | 10/2007 | Harrison | 434/236 |
| 2012/0115581 | A1* | 5/2012 | Englman et al. | 463/25 |
| 2012/0322545 | A1* | 12/2012 | Arnone et al. | 463/25 |
| 2013/0190074 | A1* | 7/2013 | Arnone et al. | 463/25 |

OTHER PUBLICATIONS

Starcraft game manul, released on May 1998.*

* cited by examiner

*Primary Examiner* — Masud Ahmed
(74) *Attorney, Agent, or Firm* — Schwegman Lundberg & Woessner, P.A.

(57) ABSTRACT

A system, computer-readable storage medium storing at least one program, and a computer-implemented method for representing a resource object in a virtual environment are presented. To begin, a graphical user interface may be provided to a player. The graphical user interface may display a virtual environment that includes the resource object and a game object. A resource production event may be detected. The resource production event may be generated based on a resource production attribute that specifies that a quantity of resource units have been generated. Based on the detected resource production event, at least some portion of the quantity of generated resource units is allocated to the resource pool. Then, responsive to detecting a user initiated game action being applied to the game object, a determinable amount of resource units is removed from the resource pool.

20 Claims, 8 Drawing Sheets

US 9,248,375 B2

SYSTEM AND METHOD TO REPRESENT A RESOURCE OBJECT IN A VIRTUAL ENVIRONMENT

CROSS REFERENCE TO RELATED APPLICATIONS

This application claims priority from U.S. Provisional Appl. No. 61/601,993, filed Feb. 22, 2012, all of which is incorporated herein by reference in its entirety for all purposes.

TECHNICAL FIELD

The present disclosure generally relates to gaming systems and, more specifically, to gaming systems providing resource objects that generate resources usable to complete game actions.

BACKGROUND

Online or web-based games typically gate a user's progress in a game by tying game actions performed by the user to an energy level. For example, a user may cause an avatar in the online or web-based game to plant a seed in a virtual garden. As another example, a user may initiate a round in a word forming game such as SCRAMBLE WITH FRIENDS®, as provided by ZYNGA INC.®, with another user. When game actions such as planting a virtual crop or initiating a round of a game are performed, a traditional game system may then deduct a determinable amount of energy from a pool of energy associated with the user. In many cases, especially after performing a number of game actions, the user may not have enough energy available in their pool of energy to perform the desired game action. In such cases, the traditional game systems may provide the user an opportunity to purchase energy so that the desired game action can be completed. Alternatively, the traditional game system may replenish energy to the pool of energy after a determinable amount of time has passed. Thus, although progress in the game is halted for a given period of time, the user may continue with the game after waiting for the energy to be replenished.

Thus, many traditional game systems may tie the acquisition of energy used within a game to a purchase or simply to the passage of time.

BRIEF DESCRIPTION OF THE DRAWINGS

The present disclosure is illustrated by way of example, and not limitation, in the figures of the accompanying drawings, in which like reference numerals indicate similar elements unless otherwise indicated. In the drawings.

DESCRIPTION OF EXAMPLE EMBODIMENTS

Overview

Figure 1:
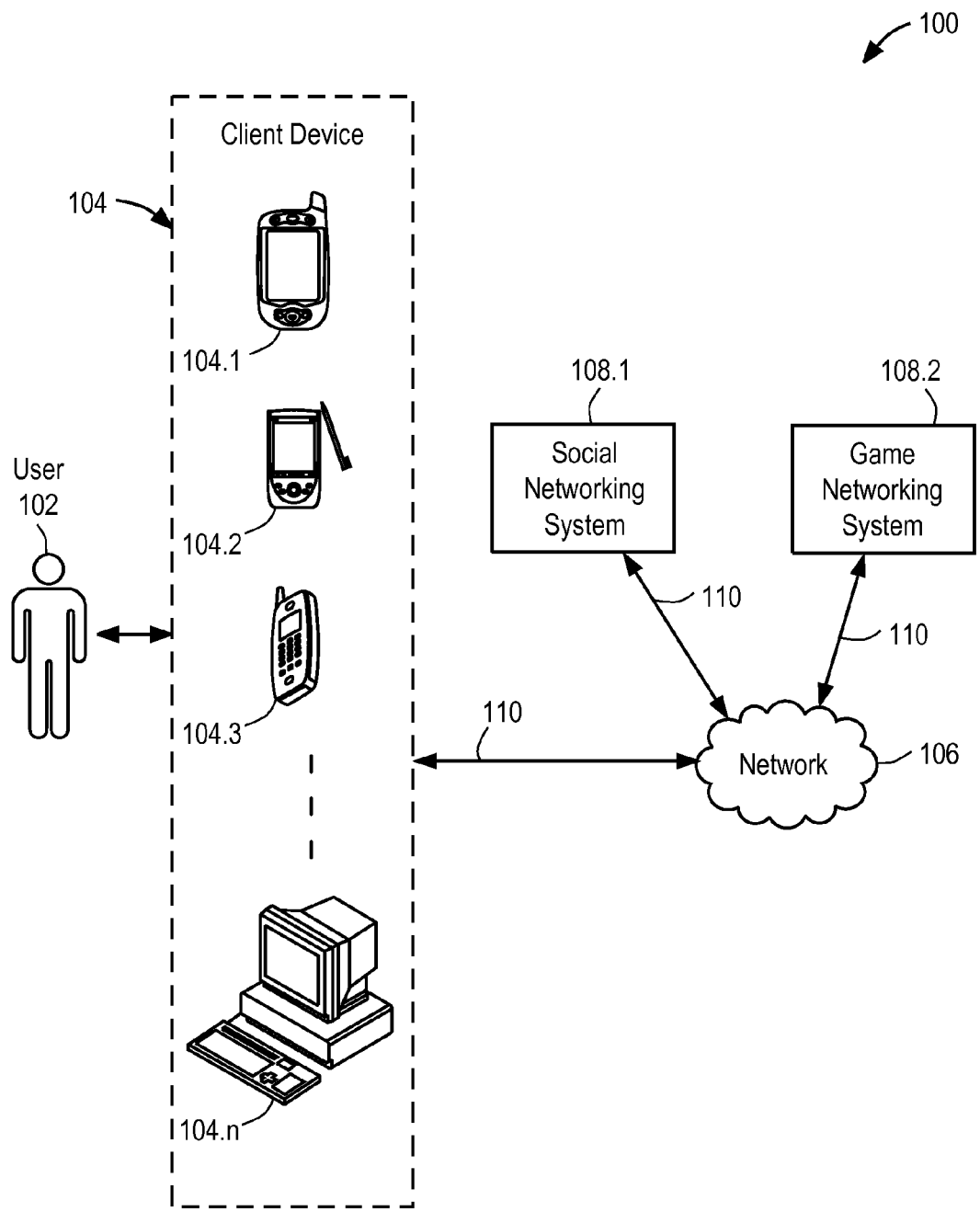
FIG. 1 illustrates an example of a system, according to some embodiments.

Users of computer-implemented systems may access a gaming platform to play online or virtual games. As used herein, the terms "user" and "player" can be used interchangeably to refer to any end user of the game hosted by the gaming platform. In an example embodiment, a gaming platform, as may be provided by ZYNGA, INC.®, may host one or more games that are accessible by computer devices operated by one or more users. In some cases, the game hosted by the gaming platform may depict a virtual environment (e.g., landscape, farm, cityscape, building, or any other suitable gaming area) that includes interactive game objects. To illustrate, in the context of a virtual farming game, such as FARM-VILLE 2®, as provided by ZYNGA, INC.®, the online game may involve the user creating, building, and managing buildings, crops, trees, livestock, decorations, and many other types of in-game objects.

In some embodiments, the gaming platform may allow a user to manage a type of in-game object referred to as a "resource object." A resource object, as used herein, may refer to an in-game object that generates, replenishes, and otherwise contributes to consumable energy usable in completing particular game actions. A game action, as used herein, may refer to a game event where a player character (described in greater detail below) performs an action on another game object, such as a crop, animals, building, tree, player character, non-player character, or the like). As an illustration, the gaming platform may host a game that allows a user to place a resource object in the playable area of a virtual environment. The resource object may then generate, possibly periodically, units of a resource that are consumed in the performance of a given user initiated game action, such as watering crops, feeding animals, building or crafting other game objects. When units of a resource are consumed in the course of performing the giving game action, the user's supply of the resource may be reduced by a determinable amount. To illustrate, watering a particular plot of farm land may reduce a determinable amount of a user's supply of a water resource (e.g., 1, 2, 5, 10, and so forth). The quantity of resources consumed by the game action may depend on the location of the game action (e.g., a particular tile of the virtual environment), the game action (e.g., watering a plant or feeding a virtual animal), or the object of the game action (e.g., a virtual seed or plant, or a virtual animal).

In some example embodiments, an amount of a resource (e.g., water resource) obtained or otherwise derived from the resource object is displayed in the context of the virtual environment (e.g., within reservoirs, dams, etc.). Accordingly, the presentation of the virtual environment may be indicative of the quantity of that resource in which is available to the user. For example, an empty reservoir within a farm may indicate depletion or lack of water resource. The lack of availability of water resources may prevent certain game actions or otherwise gate game play until sufficient water resource is collected or otherwise replenished. In further embodiments, it is envisioned that other consumables may similarly be tied to resource objects within the game, and visually incorporated as in-game assets onto the virtual environment.

Some embodiments may provide a resource pool mechanism to store a supply of a particular resource. The available supply for a particular resource, as may be stored in the resource pool, may be affected by the number of related in-game objects that are located on a virtual environment. For example, where water resource objects are available in a game, the capacity of the supply for the water resource may be dependent upon the number of water containers (e.g., wells, water tanks, and the like) located on the farm virtual environment. In essence, the additional water containers provide additional capacity to store a resource as it is replenished by the resource object. Further, the rate in which water is replenished in the resource pool may depend on other game objects in the virtual environment, such as a number of water tiles or other game objects that may facilitate improved water gathering (e.g., machines or tools such as water pumps).

It is to be appreciated that this disclosure commonly uses water as an example of a resource for the purpose of illustration but not limitation. Accordingly, such replenishing and supply concepts may be extended to types of resources other than water. For example, energy plants may use such concepts, whereby the rate of energy resource replenishment, and the maximum value to which the energy resource can be replenished, are dependent on the number of energy plants located on a user's virtual environment.

In some embodiments, resource objects may be communal or shared resources that may be linked to resources. For example, a communal water container (e.g., such as a dam) may be shared between a number of users, each of the users drawing some resource benefit from the shared water container. Such shared resource objects may be located in a particular user's virtual environment, or may be located within a shared virtual environment (e.g., users may unlock a shared virtual environment in the form of a village, within which shared resources may be built and collected). Users may furthermore bond together to form "guilds" or other groups that come together to build and contribute to resources.

These and other embodiments of the invention are described in further detail below.

Example System

FIG. 1 illustrates an example of a system 100 for implementing various example embodiments. In some embodiments, the system 100 comprises a user 102, a client device 104, a network 106, a social networking system 108.1, and a game networking system 108.2. The components of the system 100 may be connected directly or over a network 106, which may be any suitable network. In various embodiments, one or more portions of the network 106 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or any other type of network, or a combination of two or more such networks.

Although FIG. 1 illustrates a particular example of the arrangement of the user 102, the client device 104, the social networking system 108.1, the game networking system 108.2, and the network 106, this disclosure includes any suitable arrangement or configuration of the user 102, the client device 104, the social networking system 108.1, the game networking system 108.2, and the network 106.

The client device 104 may be any suitable computing device (e.g., devices 104.1-104.n), such as a smart phone 104.1, a personal digital assistant 104.2, a mobile phone 104.3, a personal computer 104.n, a laptop, a computing tablet, or any other device suitable for playing a virtual game. The client device 104 may access the social networking system 108.1 or the game networking system 108.2 directly, via the network 106, or via a third-party system. For example, the client device 104 may access the game networking system 108.2 via the social networking system 108.1. The client device 104 may be any suitable computing device, such as a personal computer, laptop, cellular phone, smart phone, computing tablet, etc.

The social networking system 108.1 may include a network-addressable computing system that can host one or more social graphs (see for example FIG. 2), and may be accessed by the other components of system 100 either directly or via the network 106. The social networking system 108.1 may generate, store, receive, and transmit social networking data.

Figure 2:
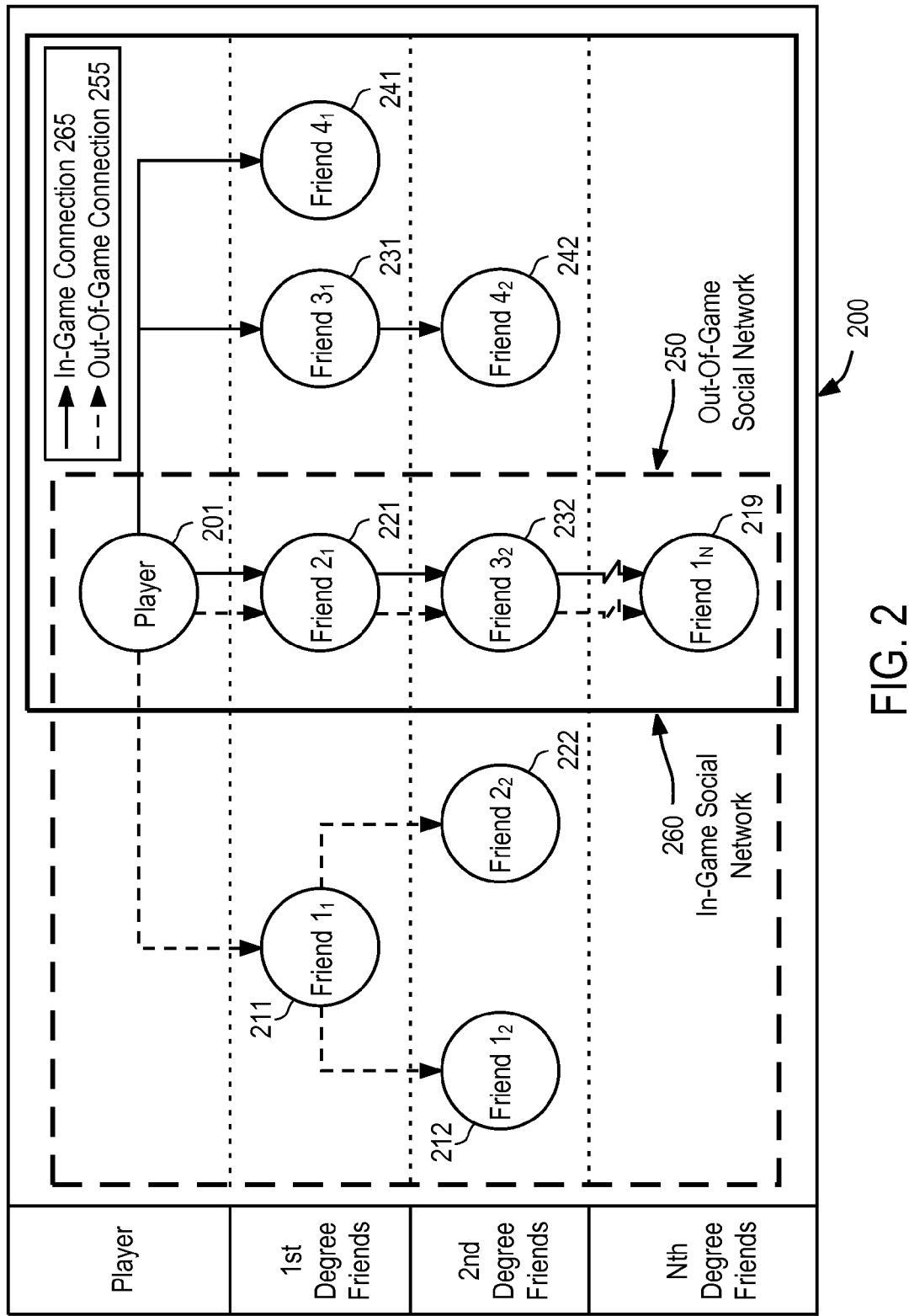
FIG. 2 shows an example of a social network within a social graph, according to some embodiments.

FIG. 2 shows an example of a social network within a social graph 200. Social graph 200 is shown by way of example to include an out-of-game social network 250, and an in-game social network 260. Moreover, in-game social network 260 may include one or more users that are friends with Player 201 (e.g., Friend 231), and may include one or more other users that are not friends with Player 201. The social graph 200 may correspond to the various users associated with the virtual game.

With reference back to FIG. 1, the game networking system 108.2 may include a network-addressable computing system (or systems) that can host one or more virtual games, for example, online games. The game networking system 108.2 may generate, store, receive, and transmit game-related data, such as, for example, game account data, game input, game state data, and game displays. The game networking system 108.2 may be accessed by the other components of system 100 either directly or via the network 106. The user 102 may use the client device 104 to access, send data to, and receive data from the social networking system 108.1 and/or the game networking system 108.2.

Figure 3:
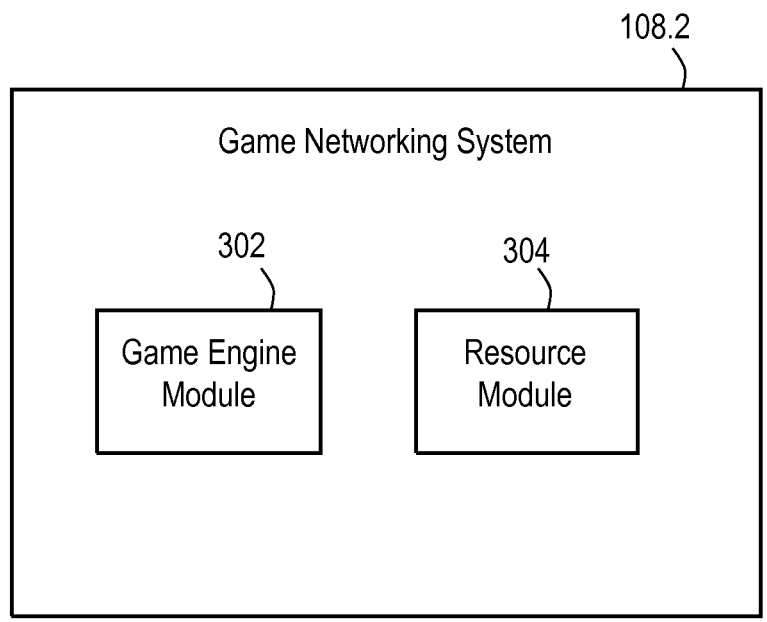
FIG. 3 is a block diagram illustrating example modules of a game networking system, according to some embodiments.

The game networking system 108.2 is now described in greater detail. FIG. 3 is a block diagram showing that the various modules of the game networking system 108.2. As shown in FIG. 3, the game networking system 108.2 includes a game engine module 302 and a resource module 304. The game engine module 302 may perform operations related to generating, storing, receiving, and transmitting game-related data, such as, for example, game account data, game input, game state data, and game displays. The resource module 304 may be configured to perform operations related to management of a user's resources affected by resource objects in the user's virtual environment.

The operations of the game engine module 302 and the resource module 304 are described in greater detail below, with reference to FIGS. 4-6.

User Interfaces

Figure 4:
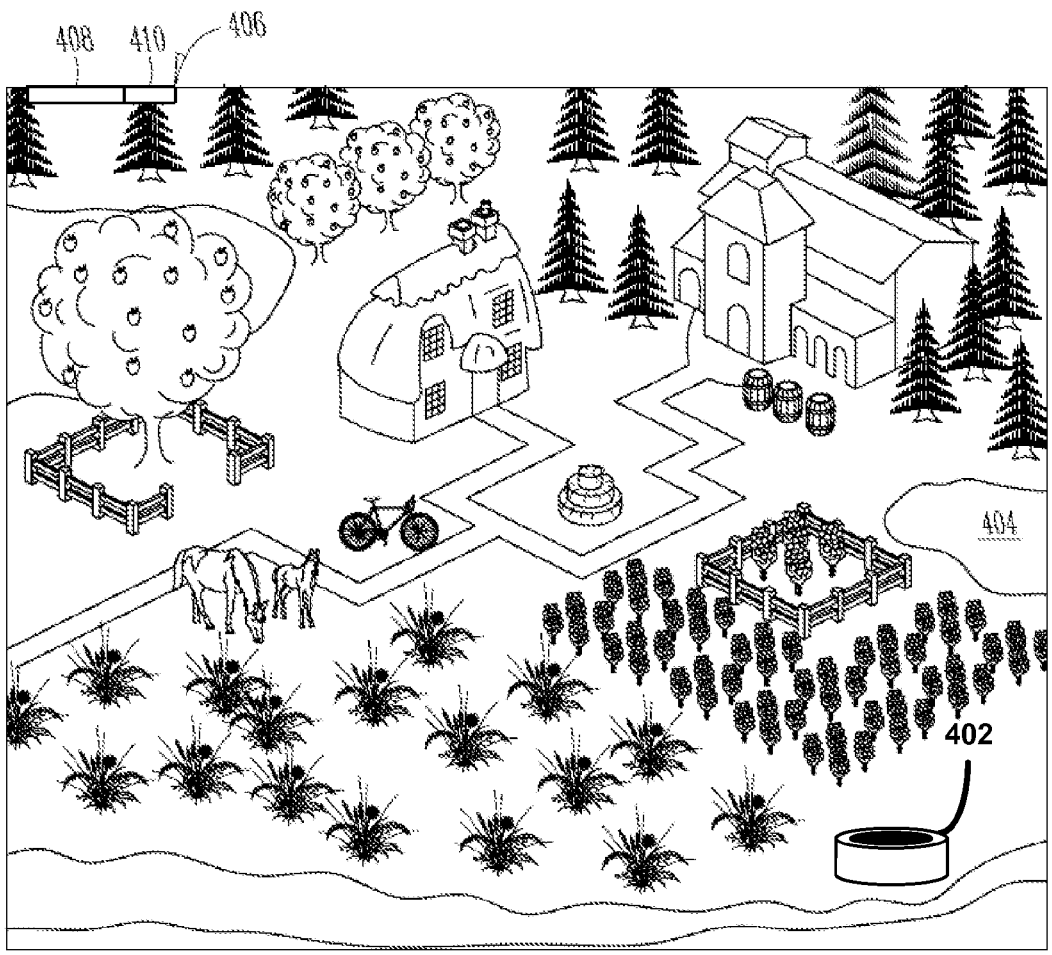
FIG. 4 is a diagram showing an example user interface, according to some embodiments.

FIG. 4 is a user interface diagram depicting a virtual environment 400 that includes resource objects 402, 404 that affect a resource, according to an example embodiment. The resource objects 402, 404 may be visually depicted using a graphical image (e.g., lakes, streams, reservoirs, wells, dams, water tower, power plants, mines, etc) indicating a type of resource produced by the resource objects 402, 404, such as water resource units. It is to be appreciated that resource objects that produce other types of resource units can use other graphical images relating to that type of resource. For example, a graphical image of a power plant may be used for a resource object that produces electricity resource units. As discussed above, the resource objects 402, 404 may be game objects. As such, each of the resource objects 402, 404 may be characterized with attributes that specify locations, size, energy production (quantity and frequency), and the like. In some embodiments, the user may interact with the resource objects 402, 404, such as move them to different locations within the virtual environment 400 or rotate their graphical images.

In an example embodiment, the resource objects 402, 404 may produce resource units according to a periodic (e.g., every X seconds) schedule and the amount of resource units produced each period may depend, for example, on attributes of the virtual resource object, such as size, or resource producing capabilities. For example, the virtual resource object 404 may consist of 10 tiles, each tile being producing 'Y' water resource units each X seconds. As described above, these resource production attributes may be stored in a data structure associated with the virtual resource object 404, which are then accessed by the resource module 304 to generate the water resource units. In some embodiments, the resource module 304 may update the graphical image associated with the resource objects depending on a length of time until the resource object produces additional resource units. For example, the resource module 304 may update the graphical image of the resource object 402 such that at the longest length of time until the resource object 402 produces resource units, the resource object 402 appears to be empty and when the resource object 402 is capable of producing resource units, the resource object 402 has a water level substantially near the top of the well.

In some embodiments, the resource module 304 may place a resource object, such as the resource object 402, responsive to the user by selecting the resource object 402 through an inventory menu (e.g., as may occur when the user receives the resource object 402 as a gift from another user, or the user purchases the resource object via a market place offered through the hosted game). Additionally or alternatively, some embodiments of the resource module 304 may be configured to create resource objects (such as the resource object 404) via a painting mechanism. An example of a painting mechanism is where the user uses a cursor to specify portions of the virtual environment that are to be designated as the resource object. To illustrate, the resource module 304 may organize the virtual environment 400 as a grid of tiles and the user may select individual tiles that may form the resource object 404.

Once the resource module 304 generates the resource units based on the resource objects 402, 404 in the virtual environment 400, the resource module 304 may allocate the generated resource units to a resource pool associated with the user. The user interface 400 includes a resource pool gauge 406 to provide a visual indication of the resource pool. For example, the resource pool gauge 406 displays a collected resource meter 408 to provide a visual indication of the number of units of water energy collected by and available to the user. The collected resource units may be used to perform game actions.

The resource pool gauge 406 may also show an unused meter 410 pool to indicate a capability of the resource pool to add additional resource units. For example, in some embodiments, the resource pool associated with a user may have a limit referred to herein as a "resource capacity." For example, a resource capacity associated with a user may limit a user from having more than Y resource units. In this way, the resource module 304 uses the resource capacity to prevent users from collecting resource units beyond this limit. In some embodiments, resource capacity may vary according to attributes associated with the user, such as a difficulty level, playing level, and experience level, as well as properties of the virtual environment belonging to the user, such as the resource objects within the user's virtual environment, or the like.

Figure 5:
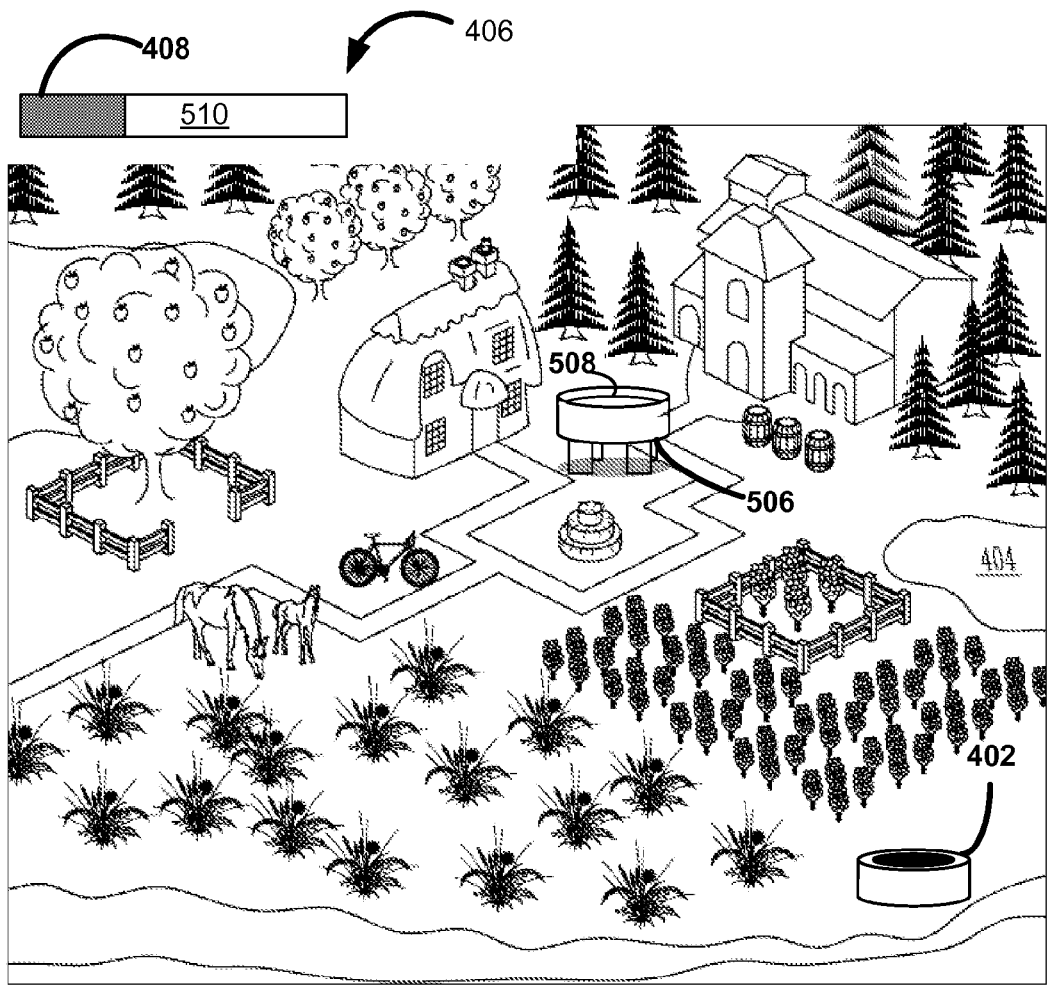
FIG. 5 is a diagram showing an example user interface, according to some embodiments.

FIG. 5 is a user interface diagram that illustrates an increase to a resource capacity of a user based on a resource object in the virtual environment 400, according to an example embodiment. For example, FIG. 5 shows that the user has placed the resource object 506 in the virtual environment 400. The resource object 506 may include an attribute that causes the resource module 304 to increase the resource capacity of the resource pool of the user. The updated resource pool gauge 406 indicates that a large portion of the gauge is marked as unused (e.g., the non-shaded portions of the resource pool gauge 406). In comparison, the unused meter 510 is comparatively longer than the unused meter 410 of FIG. 4 to indicate that the total capacity for resource units has increased based on the resource object 506 being placed in the virtual environment 400. In some embodiment, the resource gauge 406 may provide numerical representation of the number of collected resource units. Still further, some resource objects may provide a visual indication of the relative amount of the collected resource meter 408. For example, as the collected resource meter 408 increases, the resource module 304 may raise the water level 508 of the resource object 506. Further, in some embodiments, as the collected resource meter 408 decreases, the resource module 304 may lower the water level 508 of the resource object 506.

Example Methods

Figure 6:
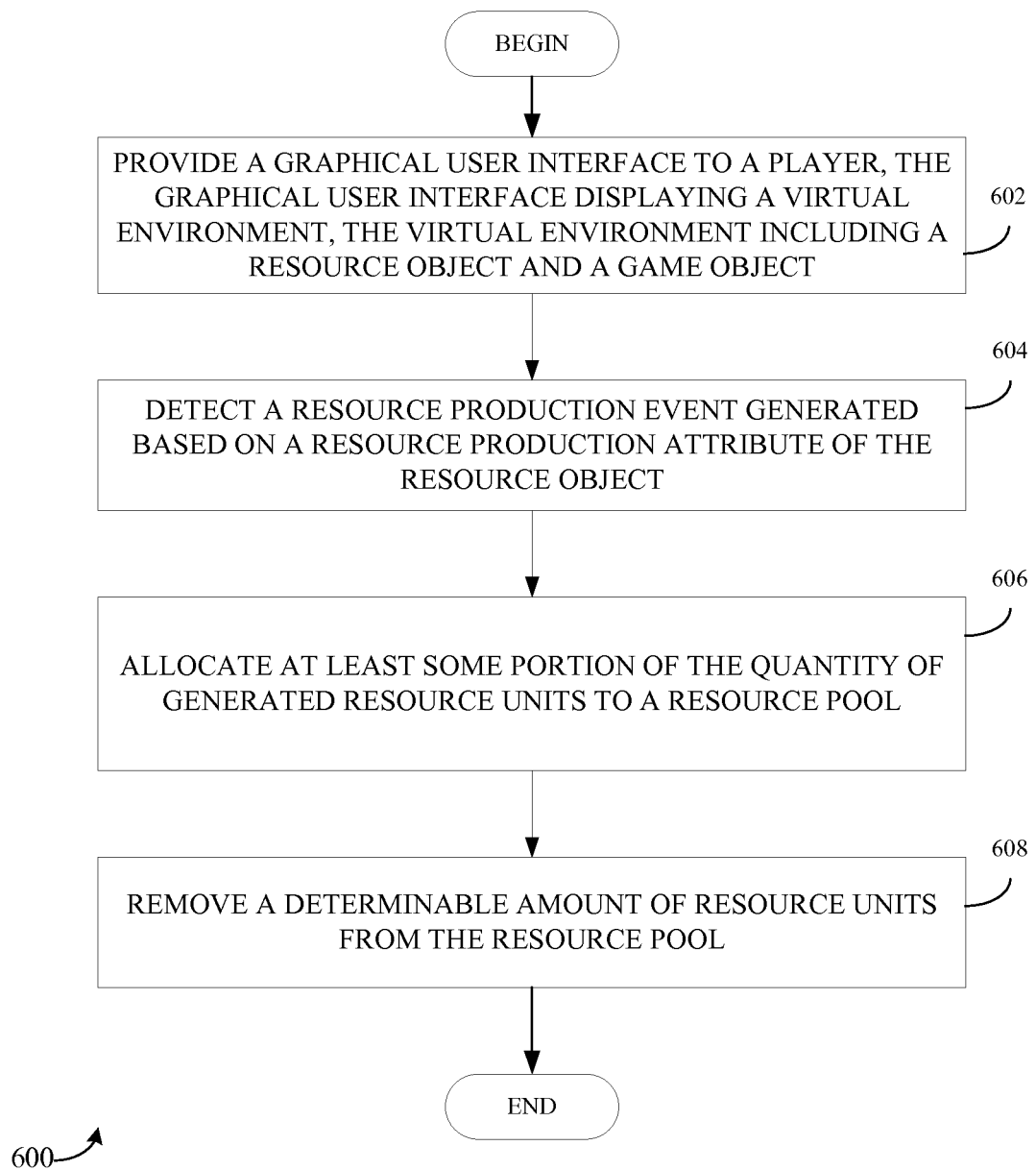
FIG. 6 is a flow chart illustrating a method of providing a resource object, according to some embodiments.

FIG. 6 is a flow chart of a method 600 of providing a game with resource objects, according to an example embodiment. The method 600 may begin at operation 602 when the resource module 304 provides a graphical user interface to a user. The graphical user interface may display a virtual environment (e.g., the virtual environment 400 of FIGS. 4 and 5) that includes a resource object and a game object. In some cases, operation 602 is performed when a user starts or resumes a game hosted by the game networking system 108.2. In such a case, the resource module 304 may assign the user with a determinable amount of resources units. As previously discussed with respect to FIGS. 4 and 5, the resource module 304 may generate a resource pool gauge (see, e.g., the resource pool gauge 406 shown in FIGS. 4 and 5) to visually depict a quantity of resource units available for use by the user. A user may "use" a resource unit to initiate a game action on a game object, where, in some cases, the game action is mapped to a resource type that matches the resource unit. For example, in some games, the user may initiate the watering of a crop, which, in turn, consumes a determinable amount of water resource units.

At operation 604, the resource module 304 may detect a resource production event generated based on a resource production attribute of the resource object. In some embodiment, the resource product event may correspond to a resource object being capable of generating a quantity of resource units. To detect the resource production event, the resource module 304 may monitor a replenish timer associated with a resource object. A replenish timer may determine a frequency in which a resource object is capable of adding resource units to the resource pool associated with the user. Such frequency may occur periodically, measured in seconds, minutes, hours, days, or some combination thereof, as may be specified by a resource production attribute of the particular resource object. Where the virtual environment includes more than one resource object, each resource object may be linked to a separate replenish timer. In this way, the resource module 304 may associate a resource pool with one or more replenishing clocks, each replenishing clock specifying a time period when a resource object is capable of replenishing the resource pool, possibly at different intervals or frequencies. In some embodiments, the resource module 304 may generate a visual indication of a timer near a resource object or the resource pool to indicate when the next replenishing event will occur.

In some embodiments, upon detecting the resource production event, the resource module 304 may update the visual image of the resource object to indicate that the resource object is capable of providing resource units to the resource pool of the user. The visual image that indicates that the resource object is capable of providing resource units may be referred to as a "resource ready state."

At operation 606, the resource module 304 may allocate at least a portion of the quantity of generated resource units to the resource pool. In some embodiments, operation 606 may occur responsive to the user selecting (e.g., clicking) the resource object. In other embodiments, the resource module 304 may automatically allocate some portion of the quantity of generated resource units responsive to detecting the resource production event.

In some cases, the game object may generate X resource units but the resource module 304 may only allocate Y resource units to the resource pool, where X>Y. Such is the case because, as described above, the resource module 304 may limit the size or capacity of a user's resource pool (e.g., the resource capacity) based on one or more resource objects within the virtual environment of the user. For example, when the resource module 304 detects that the user has caused the game engine module 302 to build a building associated with the ability to store water, the resource module 304 may increase the resource pool. This was previously described with reference to the resource object 506 of FIG. 5. The amount that the resource pool increases may, in some embodiments, depend on an attribute associated with the water storing building (e.g., a data field associated with the building that indicates an amount to increase the water pool). In this way, different resource storing buildings may increase the capacity of the water pool in different ways. Further, the game engine module 302 may allow the user to build multiple resource storage buildings to further increase the water pool.

At operation 608, responsive to detecting a user initiated game action being applied to the game object, the resource module 304 may remove a determinable amount of resource units from the resource pool. For example, a user may select a crop and the game action of watering. Responsive to detecting these selections, the resource module 304 may cause the game engine module 302 to use water resource units to perform the watering game action. When the game action is applied to the game object, units of water energy may be consumed from the water resource pool of the player. Accordingly, when the resource module 304 detects that the user uses or otherwise consumes water resource units (e.g., to perform a game action), the resource module 304 may deduct a determinable number of units of water energy from the water pool associated with the user. Further, according to some embodiments, the resource module 304 may update the graphical image of some resource game objects to reflect that the resource pool has been depleted to some extent. For example, with momentary reference to FIG. 5, the resource module 304 may update the water level 508 of the resource object 506.

As just discussed, example embodiments may remove resource units from a resource pool responsive to the user initiating a game action. It is to be appreciated that, according to some embodiments, the resource module 304 may link a given game action to a given resource pool. For example, a water resource pool may be linked to the watering game action. In this way, game developers can map water resource pools to game actions that match a particular fiction, such as watering a crop.

Example Game Systems, Social Networks, and Social Graphs

As described above, the systems described herein may include, communicate, or otherwise interact with a game system. As such, a game system is now described to illustrate further embodiments. In an online multiuser game, users control player characters (PCs), a game engine controls non-player characters (NPCs), and the game engine also manages player character state and tracks states for currently active (e.g., online) users and currently inactive (e.g., offline) users.

A player character may have a set of attributes and a set of friends associated with the player character. As used herein, the terms "state" and "attribute" can be used interchangeably to refer to any in-game characteristic of a player character, such as location, assets, levels, condition, health, status, inventory, skill set, name, orientation, affiliation, specialty, and so on. The game engine may use a player character state to determine the outcome of a game event, sometimes also considering set variables or random variables. Generally, an outcome is more favorable to a current player character (or player characters) when the player character has a better state. For example, a healthier player character is less likely to die in a particular encounter relative to a weaker player character or non-player character.

A game event may be an outcome of an engagement, a provision of access, rights and/or benefits or the obtaining of some assets (e.g., health, money, strength, inventory, land, etc.). A game engine may determine the outcome of a game event according to game rules (e.g., "a character with less than 5 health points will be prevented from initiating an attack"), based on a character's state and possibly also interactions of other player characters and a random calculation. Moreover, an engagement may include simple tasks (e.g., cross the river, shoot at an opponent), complex tasks (e.g., win a battle, unlock a puzzle, build a factory, rob a liquor store), or other events.

In a game system according to aspects of the present disclosure, in determining the outcome of a game event in a game being played by a user (or a group of more than one users), the game engine may take into account the state of the player character (or group of PCs) that is playing, but also the state of one or more PCs of offline/inactive users who are connected to the current user (or PC, or group of PCs) through the game social graph but are not necessarily involved in the game at the time.

For example, User A with six friends on User A's team (e.g., the friends that are listed as being in the user's mob/gang/set/army/business/crew/etc. depending on the nature of the game) may be playing the virtual game and choose to confront User B who has 20 friends on User B's team. In some embodiments, a user may only have first-degree friends on the user's team. In other embodiments, a user may also have second-degree and higher degree friends on the user's team. To resolve the game event, in some embodiments the game engine may total up the weapon strength of the seven members of User A's team and the weapon strength of the 21 members of User B's team and decide an outcome of the confrontation based on a random variable applied to a probability distribution that favors the side with the greater total. In some embodiments, all of this may be done without any other current active participants other than User A (e.g., User A's friends, User, B, and User B's friends could all be offline or inactive). In some embodiments, the friends in a user's team may see a change in their state as part of the outcome of the game event. In some embodiments, the state (assets, condition, level) of friends beyond the first degree are taken into account.

Example Game Networking Systems

A virtual game may be hosted by the game networking system 108.2, which can be accessed using any suitable connection 110 with a suitable client device 104. A user may have a game account on the game networking system 108.2, wherein the game account may contain a variety of information associated with the user (e.g., the user's personal information, financial information, purchase history, player character state, game state, etc.). In some embodiments, a user may play multiple games on the game networking system 108.2, which may maintain a single game account for the user with respect to the multiple games, or multiple individual game accounts for each game with respect to the user. In some embodiments, the game networking system 108.2 may assign a unique identifier to a user 102 of a virtual game hosted on the game networking system 108.2. The game networking system 108.2 may determine that the user 102 is accessing the virtual game by reading the user's cookies, which may be appended to HTTP requests transmitted by the client device 104, and/or by the user 102 logging onto the virtual game.

In some embodiments, the user 102 accesses a virtual game and control the game's progress via the client device 104 (e.g., by inputting commands to the game at the client device 104). The client device 104 can display the game interface, receive inputs from the user 102, transmit user inputs or other events to the game engine, and receive instructions from the game engine. The game engine can be executed on any suitable system (such as, for example, the client device 104, the social networking system 108.1, or the game networking system 108.2). For example, the client device 104 may download client components of a virtual game, which are executed locally, while a remote game server, such as the game networking system 108.2, provides backend support for the client components and may be responsible for maintaining application data of the game, processing the inputs from the user 102, updating and/or synchronizing the game state based on the game logic and each input from the user 102, and transmitting instructions to the client device 104. As another example, when the user 102 provides an input to the game through the client device 104 (such as, for example, by typing on the keyboard or clicking the mouse of the client device 104), the client components of the game may transmit the user's input to the game networking system 108.2.

In some embodiments, the user 102 accesses particular game instances of a virtual game. As used herein, the terms "game instance" and "virtual environment" may be used interchangeably. A game instance is a copy of a specific game play area that is created during runtime. In some embodiments, a game instance is a discrete game play area where one or more users 102 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables.

In some embodiments, a specific game instance may be associated with one or more specific users. A game instance is associated with a specific user when one or more game parameters of the game instance are associated with the specific user. For example, a game instance associated with a first user may be named "First User's Play Area." This game instance may be populated with the first user's PC and one or more in-game objects associated with the first user.

In some embodiments, a game instance associated with a specific user is only accessible by that specific user. For example, a first user may access a first game instance when playing a virtual game, and this first game instance may be inaccessible to all other users. In other embodiments, a game instance associated with a specific user is accessible by one or more other users, either synchronously or asynchronously with the specific user's game play. For example, a first user may be associated with a first game instance, but the first game instance may be accessed by all first-degree friends in the first user's social network.

In some embodiments, the set of in-game actions available to a specific user is different in a game instance that is associated with this user compared to a game instance that is not associated with this user. The set of in-game actions available to a specific user in a game instance associated with this user may be a subset, superset, or independent of the set of in-game actions available to this user in a game instance that is not associated with him. For example, a first user may be associated with Blackacre Farm in an online farming game, and may be able to plant crops on Blackacre Farm. If the first user accesses a game instance associated with another user, such as Whiteacre Farm, the game engine may not allow the first user to plant crops in that game instance. However, other in-game actions may be available to the first user, such as watering or fertilizing crops on Whiteacre Farm.

In some embodiments, a game engine interfaces with a social graph. Social graphs are models of connections between entities (e.g., individuals, users, contacts, friends, users, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In some embodiments, a unique client identifier may be assigned to individual users in the social graph. This disclosure assumes that at least one entity of a social graph is a user or player character in an online multiuser game.

In some embodiments, the social graph is managed by the game networking system 108.2, which is managed by the game operator. In other embodiments, the social graph is part of a social networking system 108.1 managed by a third party (e.g., Facebook, Friendster, Myspace). In yet other embodiments, the user 102 has a social network on both the game networking system 108.2 and the social networking system 108.1, wherein the user 102 can have a social network on the game networking system 108.2 that is a subset, superset, or independent of the user's social network on the social networking system 108.1. In such combined systems, game network system 108.2 can maintain social graph information with edge-type attributes that indicate whether a given friend is an "in-game friend," an "out-of-game friend," or both. The various embodiments disclosed herein are operable when the social graph is managed by the social networking system 108.1, the game networking system 108.2, or both.

Example Systems and Methods

Returning to FIG. 2, the User 201 may be associated, connected or linked to various other users, or "friends," within the out-of-game social network 250. These associations, connections or links can track relationships between users within the out-of-game social network 250 and are commonly referred to as online "friends" or "friendships" between users. Each friend or friendship in a particular user's social network within a social graph is commonly referred to as a "node." For purposes of illustration, the details of out-of-game social network 250 are described in relation to User 201. As used herein, the terms "user" and "player" can be used interchangeably and can refer to any user in an online multiuser game system or social networking system. As used herein, the term "friend" can mean any node within a user's social network.

As shown in FIG. 2, User 201 has direct connections with several friends. When User 201 has a direct connection with another individual then that connection may be referred to as a first-degree friend. In out-of-game social network 250, User 201 has two first-degree friends. That is, User 201 is directly connected to Friend $1_1$ 211 and Friend $2_1$ 221. In social graph 200, it is possible for individuals to be connected to other individuals through their first-degree friends (e.g., friends of friends). As described above, the number of edges in a minimum path that connects a user to another user is considered the degree of separation. For example, FIG. 2 shows that User 201 has three second-degree friends to which User 201 is connected via User 201's connection to User 201's first-degree friends. Second-degree Friend $1_2$ 212 and Friend $2_2$ 222 are connected to User 201 via User 201's first-degree Friend $1_1$ 211. The limit on the depth of friend connections, or the number of degrees of separation for associations, that User 201 is allowed is typically dictated by the restrictions and policies implemented by the social networking system 108.1.

In various embodiments, User 201 can have Nth-degree friends connected to him through a chain of intermediary degree friends as indicated in FIG. 2. For example, Nth-degree Friend $1_N$ 219 is connected to User 201 within in-game social network 260 via second-degree Friend $3_2$ 232 and one or more other higher-degree friends.

In some embodiments, a user (or player character) has a social graph within an online multiuser game that is maintained by the game engine and another social graph maintained by a separate social networking system. FIG. 2 depicts an example of in-game social network 260 and out-of-game social network 250. In this example, User 201 has out-of-game connections 255 to a plurality of friends, forming out-of-game social network 250. Here, Friend $1_1$ 211 and Friend $2_1$ 221 are first-degree friends with User 201 in User 201's out-of-game social network 250. User 201 also has in-game connections 265 to a plurality of users, forming in-game social network 260. Here, Friend $2_1$ 221, Friend $3_1$ 231, and Friend $4_1$ 241 are first-degree friends with User 201 in User 201's in-game social network 260. In some embodiments, a game engine can access in-game social network 260, out-of-game social network 250, or both.

In some embodiments, the connections in a user's in-game social network is formed both explicitly (e.g., when users "friend" each other) and implicitly (e.g., when the system observes user behaviors and "friends" users to each other). Unless otherwise indicated, reference to a friend connection between two or more users can be interpreted to cover both explicit and implicit connections, using one or more social graphs and other factors to infer friend connections. The friend connections can be unidirectional or bidirectional. It is also not a limitation of this description that two users who are deemed "friends" for the purposes of this disclosure are not friends in real life (e.g., in disintermediated interactions or the like), but that could be the case.

FIG. 6 illustrates an example data flow between example components of an example system 700. One or more of the components of the example system 700 may correspond to one or more of the components of the example system 100. In some embodiments, system 700 includes a client system 730, a social networking system 720a, and a game networking system 720b. The components of system 700 can be connected to each other in any suitable configuration, using any suitable type of connection. The components may be connected directly or over any suitable network. The client system 730, the social networking system 720a, and the game networking system 720b may have one or more corresponding data stores such as the local data store 725, the social data store 745, and the game data store 765, respectively.

The client system 730 may receive and transmit data 723 to and from the game networking system 720b. This data can include, for example, a web page, a message, a game input, a game display, a HTTP packet, a data request, transaction information, and other suitable data. At some other time, or at the same time, the game networking system 720b may communicate data 743, 747 (e.g., game state information, game system account information, page info, messages, data requests, updates, etc.) with other networking systems, such as the social networking system 720a (e.g., Facebook, Myspace, etc.). The client system 730 can also receive and transmit data 727 to and from the social networking system 720a. This data can include, for example, web pages, messages, social graph information, social network displays, HTTP packets, data requests, transaction information, updates, and other suitable data.

Communication between the client system 730, the social networking system 720a, and the game networking system 720b can occur over any appropriate electronic communication medium or network using any suitable communications protocols. For example, the client system 730, as well as various servers of the systems described herein, may include Transport Control Protocol/Internet Protocol (TCP/IP) networking stacks to provide for datagram and transport functions. Of course, any other suitable network and transport layer protocols can be utilized.

In some embodiments, an instance of a virtual game is stored as a set of game state parameters that characterize the state of various in-game objects, such as, for example, player character state parameters, non-player character parameters, and virtual item parameters. In some embodiments, game state is maintained in a database as a serialized, unstructured string of text data as a so-called Binary Large Object (BLOB). When a user accesses a virtual game on the game networking system 720b, the BLOB containing the game state for the instance corresponding to the user may be transmitted to the client system 730 for use by a client-side executed object to process. In some embodiments, the client-side executable is a FLASH-based game, which can de-serialize the game state data in the BLOB. As a user plays the game, the game logic implemented at the client system 730 maintains and modifies the various game state parameters locally. The client-side game logic may also batch game events, such as mouse clicks, and transmit these events to the game networking system 720b. Game networking system 720b may itself operate by retrieving a copy of the BLOB from a database or an intermediate memory cache (memcache) layer. The game networking system 720b can also de-serialize the BLOB to resolve the game state parameters and execute its own game logic based on the events in the batch file of events transmitted by the client to synchronize the game state on the server side. The game networking system 720b may then re-serialize the game state, now modified into a BLOB, and pass this to a memory cache layer for lazy updates to a persistent database.

In some embodiments, a computer-implemented game is a text-based or turn-based game implemented as a series of web pages that are generated after a user selects one or more actions to perform. The web pages may be displayed in a browser client executed on the client system 730. For example, a client application downloaded to the client system 730 may operate to serve a set of web pages to a user. As another example, a virtual game may be an animated or rendered game executable as a stand-alone application or within the context of a webpage or other structured document. In some embodiments, the virtual game is implemented using Adobe Flash-based technologies. As an example, a game may be fully or partially implemented as a SWF object that is embedded in a web page and executable by a Flash media user plug-in. In some embodiments, one or more described web pages is associated with or accessed by the social networking system 720*a*. This disclosure contemplates using any suitable application for the retrieval and rendering of structured documents hosted by any suitable network-addressable resource or website.

Application event data of a game is any data relevant to the game (e.g., user inputs). In some embodiments, each application datum may have a name and a value, and the value of the application datum may change (e.g., be updated) at any time. When an update to an application datum occurs at the client system 730, either caused by an action of a game user or by the game logic itself, the client system 730 may need to inform the game networking system 720*b* of the update. For example, if the game is a farming game with a harvest mechanic (such as Zynga FarmVille), an event can correspond to a user clicking on a parcel of land to harvest a crop. In such an instance, the application event data may identify an event or action (e.g., harvest) and an object in the game to which the event or action applies.

In some embodiments, one or more objects of a game is represented as an Adobe Flash object. Flash may manipulate vector and raster graphics, and supports bidirectional streaming of audio and video. "Flash" may mean the authoring environment, the user, or the application files. In some embodiments, the client system 730 may include a Flash client. The Flash client may be configured to receive and run Flash application or game object code from any suitable networking system (such as, for example, the social networking system 720*a* or the game networking system 720*b*). In some embodiments, the Flash client is run in a browser client executed on the client system 730. A user can interact with Flash objects using the client system 730 and the Flash client. The Flash objects can represent a variety of in-game objects. Thus, the user may perform various in-game actions on various in-game objects by making various changes and updates to the associated Flash objects.

In some embodiments, in-game actions are initiated by clicking or similarly interacting with a Flash object that represents a particular in-game object. For example, a user can interact with a Flash object to use, move, rotate, delete, attack, shoot, or harvest an in-game object. This disclosure contemplates performing any suitable in-game action by interacting with any suitable Flash object. In some embodiments, when the user makes a change to a Flash object representing an in-game object, the client-executed game logic may update one or more game state parameters associated with the in-game object. To ensure synchronization between the Flash object shown to the user at the client system 730, the Flash client may send the events that caused the game state changes to the in-game object to the game networking system 720*b*. However, to expedite the processing and hence the speed of the overall gaming experience, the Flash client may collect a batch of some number of events or updates into a batch file. The number of events or updates may be determined by the Flash client dynamically or determined by the game networking system 720*b* based on server loads or other factors. For example, client system 730 may send a batch file to the game networking system 720*b* whenever 50 updates have been collected or after a threshold period of time, such as every minute.

As used herein, the term "application event data" may refer to any data relevant to a computer-implemented virtual game application that may affect one or more game state parameters, including, for example and without limitation, changes to user data or metadata, changes to user social connections or contacts, user inputs to the game, and events generated by the game logic. In some embodiments, each application datum has a name and a value. The value of an application datum may change at any time in response to the game play of a user or in response to the game engine (e.g., based on the game logic). In some embodiments, an application data update occurs when the value of a specific application datum is changed.

In some embodiments, when a user plays a virtual game on the client system 730, the game networking system 720*b* serializes all the game-related data, including, for example and without limitation, game states, game events, user inputs, for this particular user and this particular game into a BLOB and may store the BLOB in a database. The BLOB may be associated with an identifier that indicates that the BLOB contains the serialized game-related data for a particular user and a particular virtual game. In some embodiments, while a user is not playing the virtual game, the corresponding BLOB may be stored in the database. This enables a user to stop playing the game at any time without losing the current state of the game the user is in. When a user resumes playing the game next time, game networking system 720*b* may retrieve the corresponding BLOB from the database to determine the most-recent values of the game-related data. In some embodiments, while a user is playing the virtual game, the game networking system 720*b* also loads the corresponding BLOB into a memory cache so that the game system may have faster access to the BLOB and the game-related data contained therein.

Figure 7:
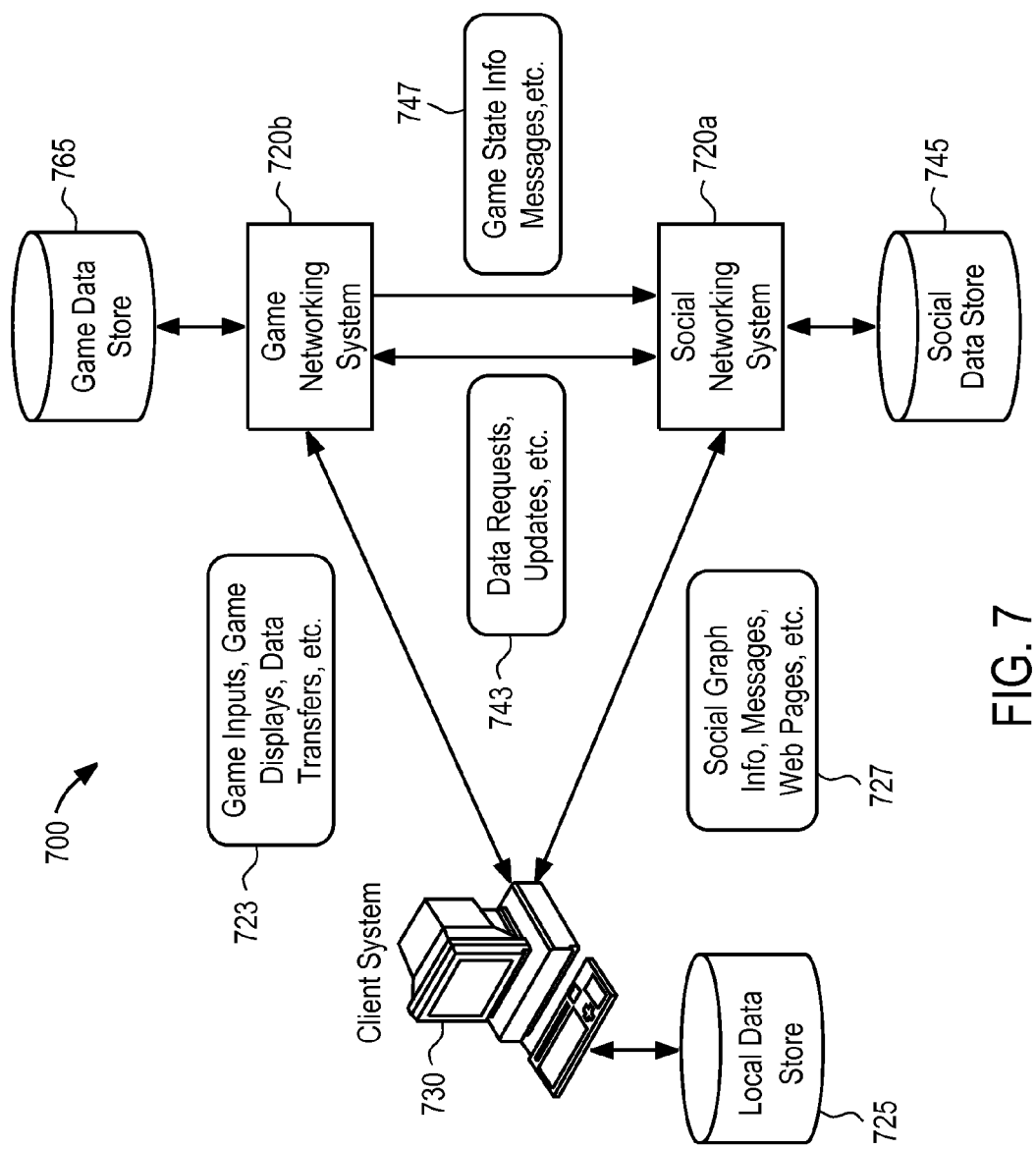
FIG. 7 illustrates an example data flow between example components of the example system of FIG. 1, according to some embodiments.

Various embodiments may operate in a wide area network environment, such as the Internet, including multiple network addressable systems. FIG. 7 illustrates an example network environment 800, in which various example embodiments may operate. Network cloud 860 generally represents one or more interconnected networks, over which the systems and hosts described herein can communicate. Network cloud 860 may include packet-based wide area networks (such as the Internet), private networks, wireless networks, satellite networks, cellular networks, paging networks, and the like. As FIG. 7 illustrates, various embodiments may operate in a network environment 800 comprising one or more networking systems, such as a social networking system 820*a*, a game networking system 820*b*, and one or more client systems 830. The components of the social networking system 820*a* and the game networking system 820*b* operate analogously; as such, hereinafter they may be referred to simply as the networking system 820. The client systems 830 are operably connected to the network environment 800 via a network service provider, a wireless carrier, or any other suitable means.

The networking system 820 is a network addressable system that, in various example embodiments, comprises one or more physical servers 822 and data stores 824. The one or more physical servers 822 are operably connected to computer network cloud 860 via, by way of example, a set of routers and/or networking switches 826. In an example embodiment, the functionality hosted by the one or more physical servers 822 may include web or HTTP servers, FTP servers, as well as, without limitation, webpages and applications implemented using Common Gateway Interface (CGI) script, PHP Hyper-text Preprocessor (PHP), Active Server Pages (ASP), Hyper-Text Markup Language (HTML), Extensible Markup Language (XML), Java, JavaScript, Asynchronous JavaScript and XML (AJAX), Flash, ActionScript, and the like.

The physical servers 822 may host functionality directed to the operations of the networking system 820. Hereinafter servers 822 may be referred to as server 822, although the server 822 may include numerous servers hosting, for example, the networking system 820, as well as other content distribution servers, data stores, and databases. Data store 824 may store content and data relating to, and enabling, operation of, the networking system 820 as digital data objects. A data object, in some embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc.

Logically, data store 824 corresponds to one or more of a variety of separate and integrated databases, such as relational databases and object-oriented databases, that maintain information as an integrated collection of logically related records or files stored on one or more physical systems. Structurally, data store 824 may generally include one or more of a large class of data storage and management systems. In some embodiments, data store 824 may be implemented by any suitable physical system(s) including components, such as one or more database servers, mass storage media, media library systems, storage area networks, data storage clouds, and the like. In one example embodiment, data store 824 includes one or more servers, databases (e.g., MySQL), and/or data warehouses. Data store 824 may include data associated with different networking system 820 users and/or client systems 830.

The client system 830 is generally a computer or computing device including functionality for communicating (e.g., remotely) over a computer network. The client system 830 may be a desktop computer, laptop computer, personal digital assistant (PDA), in- or out-of-car navigation system, smart phone or other cellular or mobile phone, or mobile gaming device, among other suitable computing devices. Client system 830 may execute one or more client applications, such as a Web browser.

When a user at a client system 830 desires to view a particular webpage (hereinafter also referred to as target structured document) hosted by the networking system 820, the user's web browser, or other document rendering engine or suitable client application, formulates and transmits a request to the networking system 820. The request generally includes a URL or other document identifier as well as metadata or other information. By way of example, the request may include information identifying the user, a timestamp identifying when the request was transmitted, and/or location information identifying a geographic location of the user's client system 830 or a logical network location of the user's client system 830.

Although the example network environment 800 described above and illustrated in FIG. 7 is described with respect to the social networking system 820a and the game networking system 820b, this disclosure encompasses any suitable network environment using any suitable systems. For example, a network environment may include online media systems, online reviewing systems, online search engines, online advertising systems, or any combination of two or more such systems.

Figure 8:
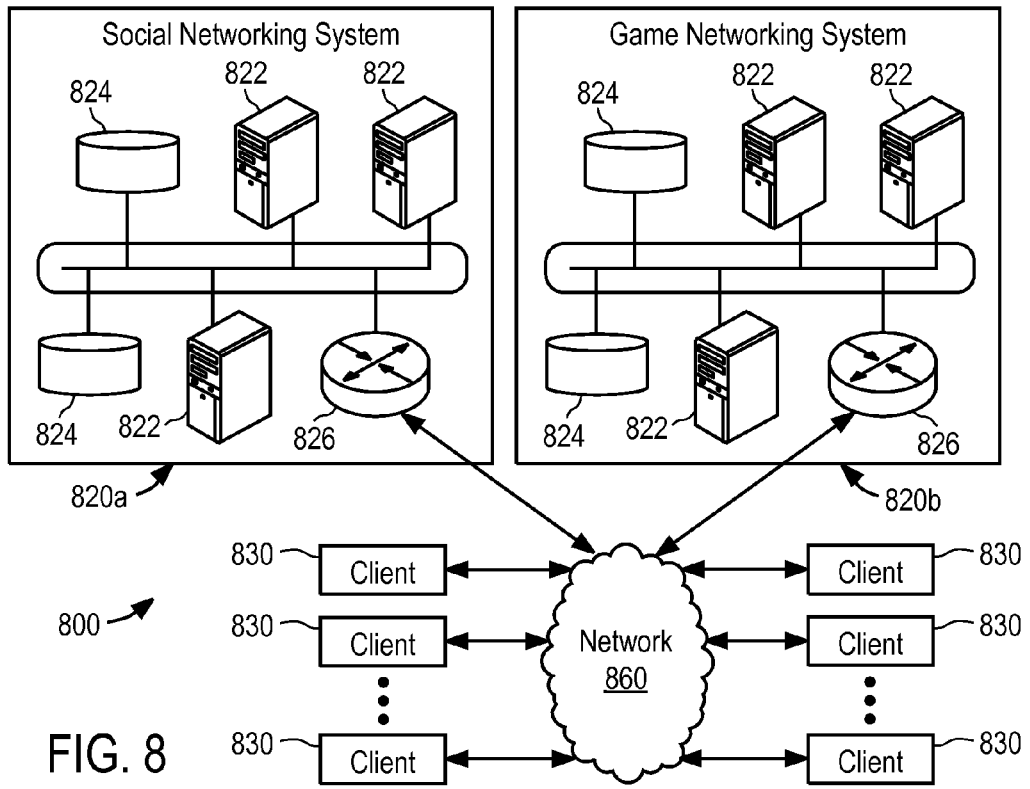
FIG. 8 illustrates an example network environment, in which various example embodiments may operate.
Figure 9:
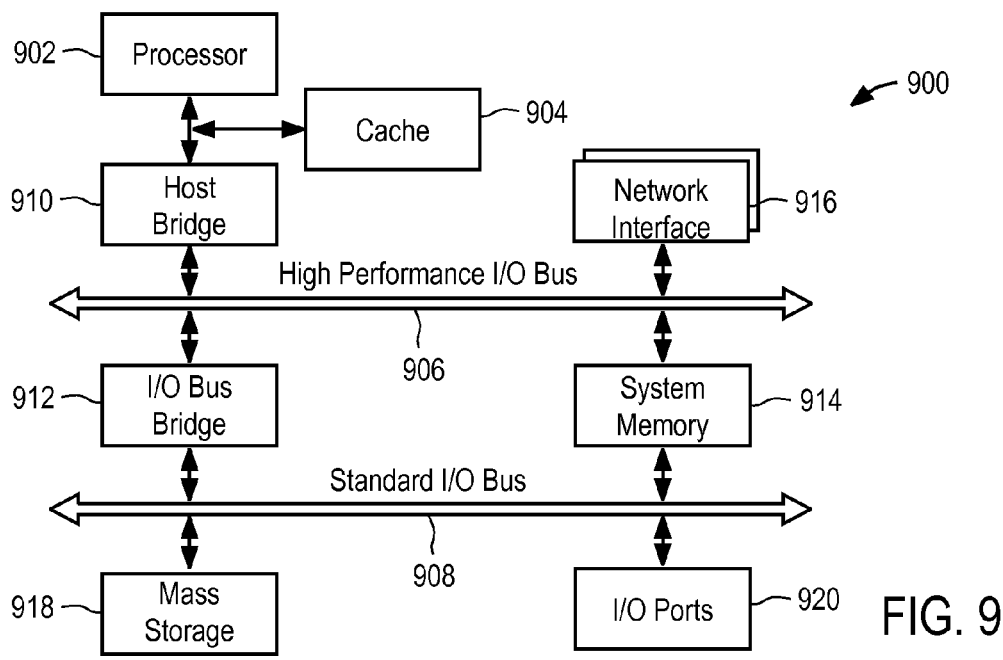
FIG. 9 illustrates an example computing system architecture, which may be used to implement one or more of the methodologies described herein, according to some embodiments.

FIG. 8 illustrates an example computing system architecture, which may be used to implement a server 822 or a client system 830. In one embodiment, the hardware system 900 comprises a processor 902, a cache memory 904, and one or more executable modules and drivers, stored on a tangible computer-readable storage medium, directed to the functions described herein. Additionally, the hardware system 900 may include a high performance input/output (I/O) bus 906 and a standard I/O bus 908. A host bridge 910 may couple the processor 902 to the high performance I/O bus 906, whereas the I/O bus bridge 912 couples the two buses 906 and 908 to each other. A system memory 914 and one or more network/communication interfaces 916 may couple to the bus 906. The hardware system 900 may further include video memory (not shown) and a display device coupled to the video memory. Mass storage 918 and I/O ports 920 may couple to the bus 908. The hardware system 900 may optionally include a keyboard, a pointing device, and a display device (not shown) coupled to the bus 908. Collectively, these elements are intended to represent a broad category of computer hardware systems.

The elements of the hardware system 900 are described in greater detail below. In particular, the network interface 916 provides communication between the hardware system 900 and any of a wide range of networks, such as an Ethernet (e.g., IEEE 802.3) network, a backplane, etc. The mass storage 918 provides permanent storage for the data and programming instructions to perform the above-described functions implemented in servers 822 of FIG. 7, whereas system memory 914 (e.g., DRAM) provides temporary storage for the data and programming instructions when executed by the processor 902. I/O ports 920 are one or more serial and/or parallel communication ports that provide communication between additional peripheral devices, which may be coupled to the hardware system 900.

The hardware system 900 may include a variety of system architectures and various components of the hardware system 900 may be rearranged. For example, cache memory 904 may be on-chip with the processor 902. Alternatively, the cache memory 904 and the processor 902 may be packed together as a "processor module," with processor 902 being referred to as the "processor core." Furthermore, certain embodiments of the present disclosure may neither require nor include all of the above components. For example, the peripheral devices shown coupled to the standard I/O bus 908 may couple to the high performance I/O bus 906. In addition, in some embodiments, only a single bus may exist, with the components of the hardware system 900 being coupled to the single bus. Furthermore, the hardware system 900 may include additional components, such as additional processors, storage devices, or memories.

An operating system manages and controls the operation of the hardware system 900, including the input and output of data to and from software applications (not shown). The operating system provides an interface between the software applications being executed on the system and the hardware components of the system. Any suitable operating system may be used.

Furthermore, the above-described elements and operations may comprise instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions may be executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the embodiments can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A computer-implemented method, comprising:
   providing, by one or more processors, a graphical user interface to a player, the graphical user interface displaying a virtual environment, the virtual environment including a resource object and a game object;
   receiving a selection from a user of a portion of the virtual environment displayed in the virtual environment;
   creating a resource object, from the selected portion of the virtual environment, for storing at least a portion of a current resource pool belonging to the user, wherein the resource object comprises a resource production attribute and increases an available storage capacity of the current resource pool according to a respective quantity of resource units;
   detecting a resource production event generated based on the resource production attribute of the resource object, the resource production event specifying that a quantity of resource units have been generated;
   based on the detected resource production event, allocating at least some portion of the quantity of generated resource units to the resource pool belonging to the user; and
   responsive to detecting a user initiated game action applied to the game object, removing a determinable amount of resource units from the resource pool.

2. The computer-implemented method of claim 1, wherein the resource object is depicted as a well, a river, a lake, a stream, a reservoir, a dam, or a water tower.

3. The computer-implemented method of claim 1, further comprising updating a visual representation of the resource object based on an amount of resource units in the resource pool.

4. The computer-implemented method of claim 3, further comprising generating a visual indication of the resource pool, the visual indication of the resource pool including an indication of an amount of resource units collected by the user.

5. The computer-implemented method of claim 4, further comprising updating the visual indication of the amount of resource collected by the user in response to allocating the at least some portion of the quantity of generated resource units to the resource pool belonging to the user.

6. The computer-implemented method of claim 1, wherein the resource object having been previously created responsive to the user selecting tiles within the virtual environment.

7. The computer-implemented method of claim 6, wherein the quantity of resource units generated is dependent on a number of tiles selected by the user.

8. The computer-implemented method of claim 1, based further on the detected resource production event, updating a visual image of the resource object, the visual image representing a resource ready state.

9. The computer-implemented method of claim 1, wherein removing the determinable amount of resource units from the resource pool is based on the game action being mapped to the resource pool.

10. The computer-implemented method of claim 1, further comprising:
    detecting a user placement of an additional resource object within the virtual environment;
    responsive to detecting the user placement of the additional resource object, increasing a resource capacity of the resource pool, the resource capacity specifying a number of resource units that the resource pool may store.

11. A computer system, comprising:
    at least one processor; and
    a resource module implemented by the at least one processor and configured to:
       provide a graphical user interface to a player, the graphical user interface displaying a virtual environment, the virtual environment including a resource object and a game object;
       receive a selection from a user of a portion of the virtual environment displayed in the virtual environment;
       create a resource object, from the selected portion of the virtual environment, for storing at least a portion of a current resource pool belonging to the user, wherein the resource object comprises a resource production attribute and increases an available storage capacity of the current resource pool according to a respective quantity of resource units;

detect a resource production event generated based on the resource production attribute of the resource object, the resource production event specifying that a quantity of resource units have been generated;

allocate, based on the resource production event, at least some portion of the quantity of generated resource units to the resource pool belonging to the user; and responsive to a user initiated game action applied to the game object, removing a determinable amount of resource units from the resource pool.

12. The computer system of claim 11, further comprising updating a visual representation of the resource object based on an amount of resource units in the resource pool.

13. The computer system of claim 11, wherein the resource module is further configured to generate a visual indication of the resource pool, the visual indication of the resource pool including an indication of an amount of resource units collected by the user.

14. The computer system of claim 13, wherein the resource module is further configured to update the visual indication of the amount of resource collected by the user in response to allocating the at least some portion of the quantity of generated resource units to the resource pool belonging to the user.

15. The computer system of claim 11, wherein the resource object having been previously created responsive to the user selecting tiles within the virtual environment.

16. The computer system of claim 15, wherein the resource module is further configured to generate the quantity of resource units based at least in part on a number of tiles selected by the user.

17. The computer system of claim 11, wherein the resource module is further configured to, based further on the detected resource production event, update a visual image of the resource object, the visual image representing a resource ready state.

18. The computer system of claim 11, wherein the resource module is further configured to:

detect a user placement of an additional resource object within the virtual environment;

responsive to detecting the user placement of the additional resource object, increase a resource capacity of the resource pool, the resource capacity specifying a number of resource units that the resource pool may store.

19. A non-transitory computer-readable medium storing executable instructions thereon, which, when executed by a processor, cause the processor to perform operations comprising:

providing a graphical user interface to a player, the graphical user interface displaying a virtual environment, the virtual environment including a resource object and a game object;

receiving a selection from a user of a portion of the virtual environment displayed in the virtual environment;

creating a resource object, from the selected portion of the virtual environment, for storing at least a portion of a current resource pool belonging to the user, wherein the resource object comprises a resource production attribute and increases an available storage capacity of the current resource pool according to a respective quantity of resource units;

detecting a resource production event generated based on the resource production attribute of the resource object, the resource production event specifying that a quantity of resource units have been generated;

based on the detected resource production event, allocating at least some portion of the quantity of generated resource units to the resource pool belonging to the user; and responsive to detecting a user initiated game action being applied to the game object, removing a determinable amount of resource units from the resource pool.

20. The computer-implemented method of claim 3, further comprising:

wherein the resource pool includes an available aggregated storage capacity of the storage object and a previously selected storage object.

\* \* \* \* \*